United States Patent [19]

Schmidt

[11] 3,946,141

[45] Mar. 23, 1976

[54] COOLING APPARATUS FOR AN ELECTRIC CABLE

[75] Inventor: Fritz Schmidt, Erlangen, Germany

[73] Assignee: Siemens Aktiengesellschaft, Munich, Germany

[22] Filed: Oct. 10, 1974

[21] Appl. No.: 513,750

[30] Foreign Application Priority Data

Oct. 24, 1973 Germany............................ 2353354

[52] U.S. Cl............. 174/11 R; 137/340; 137/512.1; 174/15 S; 174/15 BH; 174/15 C
[51] Int. Cl.²...................... H01B 12/00; H01B 7/34
[58] Field of Search.. 174/15 R, 15 C, 16 R, 16 BH, 174/15 BH, 11 R, DIG. 6, 28; 137/340, 512.1

[56] References Cited
UNITED STATES PATENTS

| | | |
|---|---|---|
| 3,501,581 | 3/1970 | Edwards et al. .................. 174/15 C |
| 3,539,702 | 11/1970 | Edwards et al................. 174/15 BH |
| 3,728,463 | 4/1973 | Kullman et al.................... 174/15 C |
| 3,764,726 | 10/1973 | Kohler et al................... 174/DIG. 6 |
| 3,835,239 | 9/1974 | Schmidt et al................ 174/15 C X |
| 3,849,589 | 11/1974 | Schmidt et al................. 174/DIG. 6 |

*Primary Examiner*—Arthur T. Grimley
*Attorney, Agent, or Firm*—Kenyon & Kenyon Reilly Carr & Chapin

[57] ABSTRACT

The invention concerns apparatus for cooling an electric cable which comprises superconducting inner and outer conductors, is subdivided into at least two cable sections and is provided with cable terminations in which these inner and outer conductors are connected with respective inner and outer ordinary conductors. According to the invention, a common coolant stream for the inner conductors and inner ordinary conductors as well as for the outer conductors and outer ordinary conductors is provided for each cable termination and the cable section associated with it, the coolant being fed-in at that end of the cable section which is not connected with the cable termination. With this simple arrangement, quantities of dissipation heat produced can be removed to refrigeration machinery with relatively high efficiency.

19 Claims, 2 Drawing Figures

COOLING APPARATUS FOR AN ELECTRIC CABLE

RELATED APPLICATIONS

This application is related to application Ser. No. 513,746 filed on even date herewith and assigned to the same assignee as the present invention.

BACKGROUND OF THE INVENTION

1. Field of the Invention

The invention concerns an arrangement for cooling an electric cable which comprises concentrically arranged inner and outer conductors at high-voltage and zero potential, respectively; is cooled by a coolant to a low temperature; is subdivided into at least two cable section; and is provided at its ends with a cable termination each, in which said inner and outer conductors are connected with the respective inner and outer ordinary conductors.

2. Description of the Prior Art

In order to make the transmission of large amounts of electric power by means of a cable with conductors cooled to a low temperature, particularly by means of superconductors, as economical as possible, high transmission voltages must be provided. They are particularly necessary for a.c. transmission, because the transmission currents are limited by the fact that the magnetic induction at the surface of these conductors should not exceed a given flux density, the so-called "critical" flux density, in order to keep the a.c. losses of these conductors relatively low. To achieve a further increase of the transmitted power, with a conductor arrangement of concentrically arranged, superconducting inner and outer conductors the surface areas and therefore, also the conductor diameter, must then also be increased proportionally with the current. On the other hand, it is advisable to keep the conductor diameter as small as possible, because the thermal losses of the deep-cooled conductor arrangement increase with the surface area because of radiation and thermal inflow by way of the customary mounting and support devices. Also the relatively high cost of the superconductive material of the conductors and the desire to keep the right-of-way for the cable as narrow as possible lead to small conductor diameters.

The cooling losses of the cable terminations for such cables are determined essentially by the operating current of the cable, because the latter determines in the terminations the cross sections of the ordinary conductors to be optimized on the basis of the Joule losses and thermal inflow from about 300° to 4°K. For this reason it is advisable to choose the transmission voltage for a given transmission power as high as possible, so that the current can be kept as low as possible.

The maximum operating voltage of a cable with a coaxial conductor arrangement, particularly an a.c. cable, and of the cable terminations connected with it is determined not only by the attainable dielectric strength of the conductor insulation and its dielectric losses, but also by the requirements of the cooling loops necessary therefor. In a cooling loop for cooling the superconductors of this cable, it must be taken into consideration that the inner conductor is at high-voltage potential. As the coolant advantageously cools the superconductors by direct contact, it also assumes this potential. When feeding in the coolant for the inner conductor, the full voltage must therefore be overcome. Similar conditions supply also to the cable terminations. Their inner ordinary conductors, which are at high-voltage potential, and which are connected with the superconductors as well as also with a high-voltage feed line, are cooled by direct contact with the coolant. This insures good heat transfer and favorable heat removal. These cable terminations therefoe require coolant supply and discharge lines which must be laid out for the full potential difference.

The temperature range for cooling the superconductors of such an a.c. cable is relatively small, because the a.c. losses increase with temperature and must in general be limited. For niobium, for instance, a cooling range between 4.2° and 6°K must be provided, while the cooling range for niobium-tin, where the a.c. losses are higher, can extend from about 4.5° to 10°K. In contrast, the temperature range for cooling the ordinary conductors of the cable terminations is from about 4.2° to about 300°K, corresponding to the temperature gradient of these normal conductors. Such a temperature transition can be accomplished, for instance, by a bath of boiling helium, the evaporating helium of which rises at the ordinary conductors, which may have the form of wires or laminations, and cools them. Such a design is known, for instance, from *The Review of Scientific Instruments*, vol. 38, no. 12, December 1967, pages 1776 to 1779.

Because of the different temperature ranges and the different state and pressure conditions, one starts out generally with providing separate cooling loops for the cable line as well as for the cable terminations, in order to obtain favorable matching to the refrigeration machines necessary to operate the cable line. The coolant for the cable is generally fed from one end of the cable. At the cable termination of the cable line at the output end, however, one therefore has othehr operating temperatures and operating conditions than at the cable terminations at the input side. As good thermal contact axists, furthermore, with the normal conductors of the terminations by means of the leads to the superconductors of the cable, special measures must be taken that these contact points in the cable terminations have the same temperature as the cooling loop for the superconductors of the cable has at these points. Otherwise, nonuniformity of the cooling of the superconductors or the ordinary conductors of the cable terminations can occur. The cable terminations would then be cooled by means of the cooling loop for the superconductors of the cable, or vice versa, this cooling loop would be cooled by way of the cable terminations. For this purpose, pressure regulating devices can, for instance, be used for controlling the temperature of the coolant baths required for the normal conductors of the cable terminations as well as control devices for influencing the coolant flow rate for the inner and outer conductors of the cable line.

It is therefore an object of the invention to simplify the arrangement for cooling the cable mentioned at the outset with a cable termination at each end as described above, and in particular, to eliminate the difficulties mentioned and to make economical operation of the cable line possible.

SUMMARY OF THE INVENTION

According to the invention, this problem is solved by providing for each cable termination and the cable section connected with it a common coolant stream for the inner conductors and inner ordinary conductors, and also arranging the outer conductors and the outer ordinary conductors in a common coolant stream and by feeding-in the coolant always at that end of the cable section which is not connected with the cable termination.

With this embodiment of the invention, the temperatures of the cooling loops required for the operation of the cable line can be adjusted in a simple manner so that the dissipation heat produced can be conducted to a refrigeration machine with relatively good efficiency. In the arrangement according to the invention, identical cable terminations can be used at the start and the end of the cable. Control of the temperatures of the coolant baths for the ordinary conductors of the terminations is no longer necessary, as the coolant for cooling the cable can be used, at least in part, for the cooling of the ordinary conductors. Thus, auxiliary equipment such as filling devices for these coolant baths of the normal conductors becomes unnecessary, and the number of coolant loops is reduced accordingly.

According to a further embodiment of the arrangement for cooling a cable according to the invention, return lines may be provided into which the streams of coolant are partly fed at about the junction between the cable termination and the cable section connected with it. These return lines can advantageously be connected in a thermally conducting manner with a radiation shield arranged around the inner and outer conductors. Particularly for large lengths of the cable line, additional cable cooling can be achieved and the efficiency of refrigeration machines improved.

The pressure in the coolant streams for the inner or outer conductors of the cable can, furthermore, be controlable. To this end, throttle valves may be provided which are preferably arranged at the junction between the cable termination and the cable section connected with it. The temperature in the cable can be regulated by means of this pressure control, and in this manner a pressure of, for instance, more than 2.3 atmospheric barometric pressure can be maintained in the entire cable line, at which helium can be held in a single phase in supercritical condition. Faultless cooling of the conductors, particularly of the superconductors, is insured thereby.

DESCRIPTION OF THE INVENTION

Figure 1:
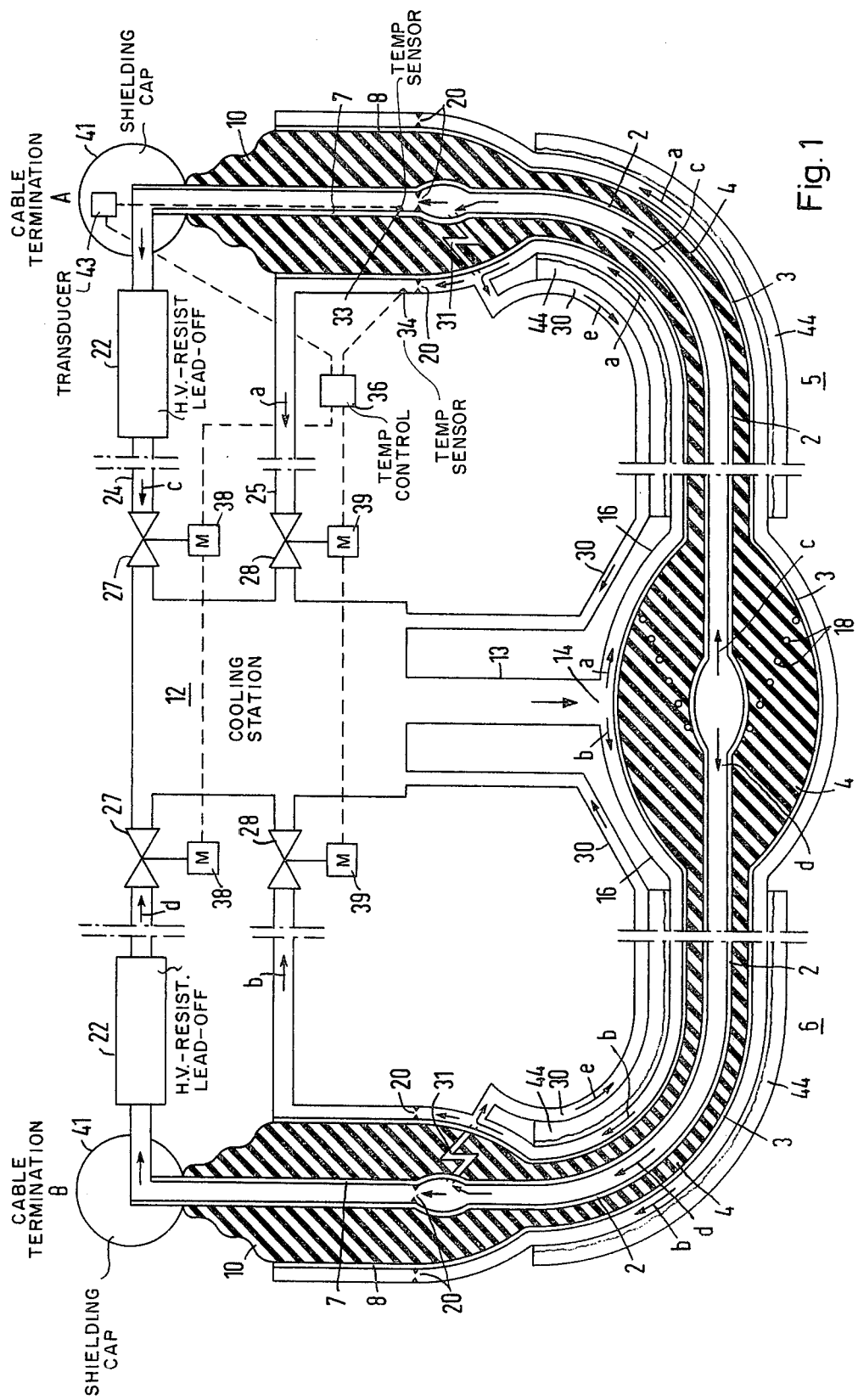
FIG. 1 schematically shows a longitudinal cross section through a section of cable, to each end of which a cable termination is connected, with an arrangement for cooling.

The coaxial cable shown in FIG. 1 has two concentric tubular conductor layers, which can serve as the outgoing and the return conductor of a phase of a three-phase system and are designated as the inner conductor 2 and the outer conductor 3. They consist, for instance, of a multiplicity of individual superconducting wires which are stabilized by a normal-conducting metal, e.g., copper or aluminum. The superconductive material, e.g., niobium, may be applied to the normal-conducting stabilizing metal in the form of a thin film.

The arrangement of these individual wires, which lie side by side on the circular circumference in the two conductor layers of the inner and outer conductor 2 and 3, respectively, can be made in a manner known in the prior art such that the overall conductor retains its constant length regardless of temperature changes (U.S. Pat. 3,835,239). The inner conductor 2 for instance, the outgoing superconducting conductor of the phase of the three-phase system, is at high-voltage potential. It is concentrically surrounded by the outer conductor 3, the superconducting return conductor, at zero potential and is electrically separated from the latter by an insulating layer 4.

The superconducting cable line is subdivided into two cable sections 5 and 6 of approximately equal length, to the other ends of which a cable termination each is connected. These cable terminations, designated A and B, are of identical design. In them, the superconducting inner conductors 2 are connected to inner ordinary conductors 7 and the superconducting outer conductors 3 are connected to outer ordinary conductors 8. The inner ordinary conductors 7 are also surrounded concentrically by the outer ordinary conductors 8 and are electrically insulated from them by means of a layer of insulation 10.

For cooling, the cable line and its cable terminations A and B are served by closed cooling loops, which are indicated in the figure by arrows. The superconductors of the cable are advantageously cooled with single-phase helium, e.g., supercritical helium, which is under a pressure higher than 2.3 atmospheric barometric pressure. The helium is pumped in a coolant feed line 13 from a cooling station 12 to the center of the cable line, where the two cable sections 5 and 6 meet, and is divided there into four coolant streams $a$ to $d$. The helium for the coolant streams of the outer conductors 3, which are designated with $a$ and $b$, enters at an inlet 14 about in the center of the cable line into a tube 16 enclosing the outer superconductor, where it is divided into two coolant streams, flowing off to both sides toward the cable terminations A and B. The coolant stream through the cable section 5 is designated with $a$, and that through the cable section 6 with $b$.

The helium for the coolant streams of the inner conductor 2, designated with $c$ and $d$, gets from the inlet point 14 by way of a spiral-shaped canal 18 through the cable insulation 4 with increased diameter and the slightly flared, tubular surface of the inner conductor 2, which consists of individual wires, into the interior of the latter and is divided, like the two coolant streams $a$ and $b$, into the two coolant streams $c$ and $d$, flowing likewise off to both sides through the cable sections 5 and 6 to the cable terminations A and B. The spiral design of the canal 18 serves for overcoming the potential drop between the inner and the outer conductor 2 and 3, respectively.

The coolant streams $a$ and $c$, as well as $b$ and $d$, now arrive at the two cable terminations A and B with the same temperature and in the same condition. They enter into the respective cable termination A or B by way of a throttling valve 20 each and cool the junctions between the superconductors of the cable and the ordinary conductors of the terminations. Depending on the cable losses, the helium is here in the liquid or gaseous state. Advantageously, it serves at the same time for cooling the current-carrying ordinary conductors 7 and 8 and is warmed up in the precess to about 300°K, i.e., room temperature. The coolant streams $c$ and $d$ of the inner normal conductors 7, which are at high-voltage potential, are brought to ground potential by means of high voltage-resistant lead-offs 22 for helium gas, which are designed for room temperature and arrive, like the helium gas of the coolant streams *a* and *b*, which are conducted through pipelines 25, back at the cooling station 12 by means of uninsulated pipelines 24.

Such simple coolant loops are usable to advantage only for relatively short cable lines, because the ratio of the cable losses to the looses of the terminations is given by the ratio of the specific heat to the sum of the heat of evaporation and the specific heat of the helium. This leads to a limitation of the cable length which, however, can be removed if one lets the helium in the coolant streams *a* to *d* enter only partially into the cable terminations through the throttle valves 20. This flow rate can be controlled, for instance, by controllable valves 27 and 28, which are advantageously arranged in the return lines 24 and 25 at ground potential. The valves 27 and 28 are advantageously controlled by monitoring the temperature of the ordinary conductors 7 and 8 in the cable terminations A and B. One or several temperature sensors which are placed along the outer ordinary conductor 8, may serve for this purpose. Corresponding temperature sensors along the inner normal conductor 7, which is at high-voltage potential, are generally not necessary if the temperature conditions for the inner and outer normal conductor 7 and 8 are approximately the same. Then, the valves 27 can be adjusted at the same time by these temperature sensors at zero potential.

If however, as shown in the figure, the conditions at the inner and the outer normal conductor 7 and 8 of the cable terminations A and B are not the same, a flow rate control can be accomplished, for instance, in such a manner that the temperature of the helium at the inner and the outer normal conductor 7 and 8 is measured by means of temperature sensors 33 and 34, which may, for instance, be germanium or carbon resistors. Their measured values are fed to a control 36, only indicated in the fugure, by way of transmission paths shown in the figure by dashed lines. By means of the control, positioning motors 38 and 39 can be actuated, which can set the valves 27 and 28 accordingly.

Additional measures are necessary to measure the temperature of the helium at the inner normal conductor 7, as the temperature sensor 33 is at high-voltage potential. The measured value of this sensor is brought from the measuring point in the interior of the inner normal conductor 7, which is in a field-free space, for instance to a static shielding cap 41 of the cable termination A or B and is brought to zero potential there by means of a measuring transducer 43, only suggested in the figure, e.g., by means of an analog-to-digital coverter, a laser diode or a light guide as an insulating element. There, it can be converted again by means of a light-sensitive element and an digital-to-analog converter and applied to the control 36.

Instead of the interposed members, laser-diode or light-guide sensitive element, a high-frequency oscillator at high-voltage potential and a receiver at zero potential can also be used to bridge the voltage.

The helium streams held back by the throttle valves 20, which are designated in the figure with *e*, are conducted from the cable section shortly ahead of the throttling valves 20. It is additionally required for the cooling of cables of larger cable length that the helium in stream *e* be returned by way of a helium line 30 to the cooling station 12, which may be connected, for instance, with a radiation shield 44. A high voltage transition element is required for returning that part of the coolant stream *c* which flows inside the inner conductor 2 and is at high-voltage potential, back to the cooling station 12. This can be an embedded plastic line, a plastic labyrinth or also a high voltage-resistant coolant lead-off. In the figure, an embedded plastic line 31 is shown, by means of which the part of the coolant stream *c* is also led into the return line 30.

The supply and discharge lines for the collant to the inner conductor 2 which are shown in the figure as a spiral-shaped canal 18 or as a plastic line 31, may consist of a plastic tube with a round or also flat, rectangular cross section which is made of the same insulating material as the cable insulation 4 or 10. One can also wrap a plastic body which has a labyrinth-like canal, into the cable insulation 4 or 10. This plastic body advantageously consists of the same material as the cable insulation 4 or 10, which may additionally also be provided with potential shields. At the cable terminations A and B, there is furthermore the possibility to provide a deflection of the part to be branched-off of the coolant streams *c* or *d* by way of the cable terminations A or B and additional high voltage-resistant lead-offs which conduct the coolant to ground potential, and to feed the branched-off part only then into the helium return line 30.

Figure 2:
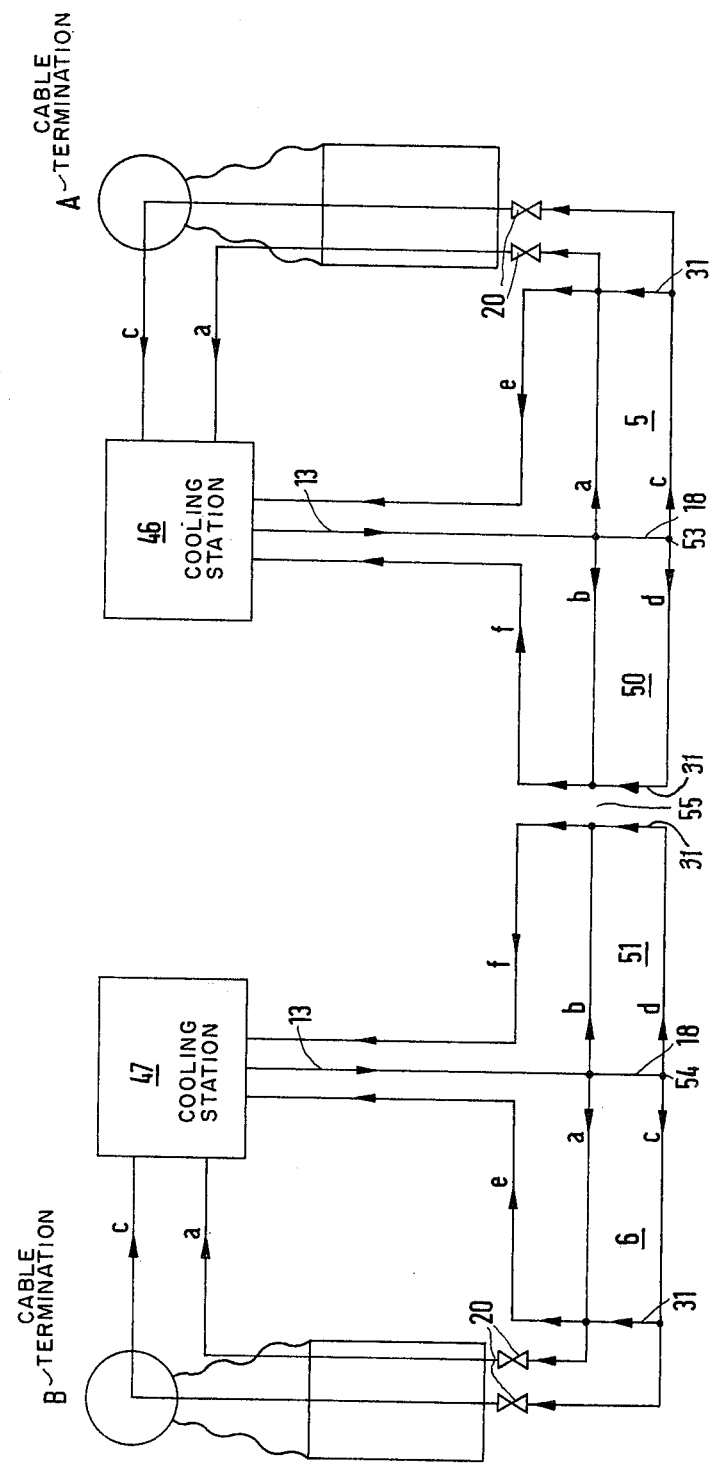
FIG. 2 shows a cooling loop diagram, for an expanded arrangement for cooling larger cable transmission lines.

The arrangement for cooling a cable with two cable terminations at its ends, as described in FIG. 1, is possible also for longer cable lengths. In FIG. 2, a suitable schematic with two cooling stations 46 and 47 and the necessary cooling loops is given. It can logically be supplemented for more cooling stations with corresponding cooling loops without cable termination. The arrangement consists of two identical halves, which each comprise two cable sections 50,5 and 51,6 and divide the cable into two approximately equal parts. With each cable half, a cooling station 46 and 47 respectively, is associated, from which the coolant, particularly helium, is applied to the cable by way of a respective coolant line 13. The coolant enters approximately at the end of the first quarter of the cable section at the junction 53 between the cable sections 50 and 5 and approximately at the end of the third quarter of the cable section at the junction 54 between the cable sections 51 and 6. There, the coolant is divided directly into two coolant streams *a* and *b* for cooling the outer conductor and, after passing a spiral-shaped canal 18 to the inner conductor, into two further coolant streams *c* and *d* for the inner conductor. The coolant streams *b* and *d* flow toward the center of the cable section, where the coolant stream *d*, after passing through a high-voltage transition element, e.g., a plastic line 31 embedded in the insulation layer between the inner and outer conductor, joins the coolant stream *b* at zero potential and is returned as the coolant return stream *f* to the cooling station 46 or 47. The coolanat return stream *f* can be used here to advangtage for cooling a radiation shield surrounding the cable. The outer cable section 5 and 6 of the cable, i.e., the first and fourth quarter of the cable section with the cable terminations A and B and the coolant streams *a* and *c*, which are returned in part as the coolant stream e to the cooling station 46 or 47, are to correspond to the parts shown in FIG. 1. Thus, a further high-voltage transition element 31 is indicated at the beginning or end, respectively, of the cable, ahead of the throttling valves 20, e.g., a plastic line embedded in the insulation layer, which serves to bridge the voltage for the part of the coolant stream which branches off into the coolant stream e.

The two cable halves with their terminations A and B and the cooling systems associated with them are constructed symmetrically to their junction, which is designated with 55. They therefore have at least approximately the same temperatures at the junction 55 between the cable section 50 and 51. In this arrangement, too, the conditions for the two cable terminations A and B are therefore the same.

The throttling valves 20 which are arranged approximately at the junction between the cable terminations A and B and the cable section may, for instance, be continuously adjustable or may be designed for open/closed operation in connection with an on-off control. The difficult actuation of the exciter winding of the valves at high-voltage potential can be accomplished in each case by means of a small generator under the shielding cap 41, by driving it by a motor at ground potential through an insulating shaft. To the extend that the flow conditions in the cable and the cable terminations permit, other throttling devices, e.g., nozzles or orifices, can also be used, however, instead of the throttling valves 20.

For the high-voltage transition elements for helium gas near room temperature, which has a particularly low dielectric strength in this case, two known methods are available for instance: For one, the dielectric strength of gaseous helium can be increased by admixing an electronegative gas (U.S. Pat. No. 3,835,239); on the other hand, the gaseous helium can be led off through capilaries of an electrically insulating material (U.S. Pat. No. 3,835,589).

In the examples of the embodiments, cables with two cable terminations for superconductors were chosen, which are cooled with helium. However, similar arrangements for other conductors cooled to low temperatures, for instance, of aluminum or beryllium, can be provided, which are cooled with other coolants, e.g., hydrogen.

Terminations of different design can also be used, besides cable terminations described in the embodiment example, for arrangements according to the invention. These may be equipped with special devices which create a potential transition zone for the coolant within the termination (previous proposal: (U.S. Pat. No. 3,900,699) and thereby make unnecessary corresponding high-voltage transition elements in the coolant lead-offs, at least in part.

What is claimed is:

1. Apparatus for cooling an electrical cable, having connectrically arranged inner and outer superconductor conductors at high voltage and zero voltage respectively, to a low temperature, said cable including means at each end terminating said superconductor conductors, each cable termination having concentric inner and outer ordinary conductors, comprising:
   a. means dividing the electrical cable into at least two cable sections whereby each cable section will have its ends defined respectively by said means dividing and one of the cable terminations;
   b. first coolant stream means for commonly forcing coolant past the inner superconductor conductor of said electrical cable in both of said sections and past each inner ordinary conductor in each of said cable terminations;
   c. second coolant stream means for commonly forcing coolant past the outer superconductor conductor of both sections of said electrical cable and past each outer ordinary conductor in said cable terminations;
   d. a cooling station for maintaining a supply of coolant;
   e. means for applying coolant from said cooling station to said first and second coolant stream means commonly at said means dividing said cable into two cable sections; and
   f. return means for returning the coolant to said cooling station after said coolant passes through said superconductor conductors and said ordinary conductors of said cable terminations.

2. The apparatus of claim 1 wherein said first and second coolant stream means are each provided with branch point means for returning a portion of said coolant to said coolant station through a return channel provided with a radiation shield.

3. The apparatus of claim 2 wherein said branch point means are positioned at the junctions between said cable sections and said cable terminations.

4. The apparatus of claim 1 wherein the pressure in said first and second coolant stream means is controlled.

5. The apparatus of claim 4 wherein throttling valves are positioned within said first and second coolant stream means approximately at the junction between each cable section and each cable termination.

6. The apparatus of claim 4 wherein pressure control valves are placed in said return means.

7. The apparatus of claim 5 wherein temperature sensors are placed within said first and second coolant stream means to generate signals which are applied to said throttling valves.

8. The apparatus of claim 6 wherein temperature sensors are placed within said first and second coolant stream means to generate signals which are applied to said pressure control valves.

9. The apparatus of claim 7 wherein said temperature sensors are carbon resistors.

10. The apparatus of claim 8 wherein said temperature sensors are carbon resistors.

11. The apparatus of claim 7 wherein said temperature sensors are germanium resistors.

12. The apparatus of claim 8 wherein said temperature sensors are germanium resistors.

13. The apparatus of claim 7 wherein said temperature sensors placed within said first coolant stream means is connected to a measuring transducer.

14. The apparatus of claim 8 wherein said temperature sensor placed within said first coolant stream means is connected to a measuring transducer.

15. The apparatus of claim 13 wherein said measuring transducer comprises an analog-to-digital converter and laser diode followed by a digital-to-analog converter.

16. The apparatus of claim 14 wherein said measuring transducer comprises an analog-to-digital converter and laser diode followed by a digital-to-analog converter.

17. The apparatus of claim 13 wherein said measuring tranducers comprises a high-frequency oscillator followed by a receiver.

18. The apparatus of claim 14 wherein said measuring tranducers comprises a high-frequency oscilator followed by a receiver.

19. The apparatus of claim 1 wherein said coolant is helium.

* * * * *

UNITED STATES PATENT AND TRADEMARK OFFICE
CERTIFICATE OF CORRECTION

PATENT NO. : 3 946 141
DATED : March 23, 1976
INVENTOR(S) : Fritz Schmidt

It is certified that error appears in the above-identified patent and that said Letters Patent are hereby corrected as shown below:

Column 1, line 17, change "section" to --sections--.

Column 2, line 36, change "othehr" to --other--.

Column 2, line 39, change "axists" to --exists--.

Column 4, line 4, change "U.S. Pat. No. 3,835,239" to --U.S. Pat. No. 3,541,221--.

Column 4, line 64, change "precess" to --process--.

Column 5, line 39, change "fugure" to --figure--.

Column 5, line 52-53, change "coverter" to --converter--.

Column 6, line 9, change "collant" to --coolant--.

Column 6, line 56, change "coolanat" to --coolant--.

Column 7, line 1, after "stream" add --c--.

Column 7, line 20, change "extend" to --extent--.

Column 7, line 32, change "capilaries" to --capillaries--.

Column 7, line 33, change "U.S. Pat. No. 3,835,589" to --U.S. Pat. No. 3,849,589--.

Signed and Sealed this

Twentieth Day of July 1976

[SEAL]

Attest:

RUTH C. MASON
*Attesting Officer*

C. MARSHALL DANN
*Commissioner of Patents and Trademarks*